United States Patent [19]

Copping

[11] 4,140,828
[45] Feb. 20, 1979

[54] INJECTION MOULDED PLASTICS ARTICLE

[75] Inventor: Keith P. Copping, Don Mills, Canada

[73] Assignee: Conlor Molding Systems Limited, Don Mills, Canada

[21] Appl. No.: 879,835

[22] Filed: Feb. 21, 1978

Related U.S. Application Data

[63] Continuation-in-part of Ser. No. 693,454, Jun. 7, 1976, abandoned.

[30] Foreign Application Priority Data

Jun. 10, 1975 [GB] United Kingdom ............... 24737/75

[51] Int. Cl.² .............................................. B32B 3/28
[52] U.S. Cl. .................................... 428/167; 428/213; 428/64; 220/66; 220/72
[58] Field of Search ................. 428/35, 167, 213, 64; 220/72, 66; 229/1.5 B, 2.5; 206/508, 821

[56] References Cited

U.S. PATENT DOCUMENTS

| | | | |
|---|---|---|---|
| 3,360,162 | 12/1967 | Miles | 206/508 |
| 3,608,143 | 9/1971 | Schutz | 229/2.5 |
| 3,679,119 | 7/1972 | Copping | 229/1.5 B |
| 3,944,124 | 3/1976 | Hexel | 229/1.5 B |

Primary Examiner—William R. Dixon, Jr.
Attorney, Agent, or Firm—Arne I. Fors

[57] ABSTRACT

A novel rib lattice structure for a substantially flat surface in a thin-walled plastics article. The lattice structure comprises a network of ribs integral with a wall and consists of a plurality of trunk ribs radiating outward from a point of injection at equal angles to each other, said trunk ribs being supplemented with ribs branching out in opposing pairs at equal intervals along the trunk ribs, each branch rib from a trunk rib proceeding on a line parallel to the adjacent trunk rib on the same side and intersecting branched ribs from the said adjacent trunk rib whereby said trunk and branch ribs interact to form a plurality of discreet rhomboidal web segments, each web segment entirely bounded by ribs being of substantially uniform size and shape.

5 Claims, 13 Drawing Figures

INJECTION MOULDED PLASTICS ARTICLE

This application is a continuation-in-part application of application Ser. No. 693,454 filed June 7, 1976, now abandoned.

BACKGROUND OF THE INVENTION

This invention relates to an injection moulded plastic article and is particularly directed to a novel rib lattice structure applied to substantially planar surfaces of injection moulded plastic articles.

In the field of manufacture by injection moulding and the merchandising of plastic articles, particularly thin-walled lid-like articles such as the lids for containers for food and beverages and articles such as trays and dishes which are all produced in mass quantities, minimization of the plastic content of the article and maximization of the allowable speed of moulding production of the article are both of high economic desirability.

Of significance in connection with this present application is the general nature of my invention disclosed in U.S. Pat. No. 3,679,119 which achieved a substantial improvement over the prior art in these two areas of economy in respect to thin-walled cup-like articles. The principal element in the aforesaid invention is a cross-lattice of intersecting ribs for application to the side wall or walls of the article dividing the wall surfaces bearing the network of ribs into a plurality of discrete rhomboidal web portions entirely bounded by said ribs, the said ribs being directed at an acute angle to the theoretical line of shortest distance in the walls between the point of injection and the moulding terminus of the article, said ribs commencing at the bottom of the side wall and extending toward the upper terminus of the side wall, each set of criss-crossing ribs respectively being substantially parallel to each other 360 degrees around the vertical axis of the cup-like article.

The rib lattice of my prior invention allows the reduction by as much as 35% of the material content of a cup-like article by permitting the moulding of extreme thinnesses in the rhomboidal rib-enclosed webs without the reduction of the structural strength of the side-walls below acceptable limits. Also it has been found that my prior invention allows increases ranging from 15% to as high as 35% over the production moulding speed for articles of conventional smooth-walled design because of the faster cooling of the reduced side-wall thicknesses.

The rib lattice structure of my prior invention, being designed for application to the side walls of cup-like articles, achieved the greatest measure of the aforementioned economies when applied to articles in which the side wall or walls comprised the major component of the article. As that invention was put into service it became apparent that there was an urgent need to achieve these same economies in a different class of plastic articles, namely lid-like articles such as lids for containers, dish-like or tray-like articles and the bottom wall elements of wide-bottomed containers in which a major portion of the total article comprised a substantially planar wall with the point of injection for the article located centrally in the planar wall, hereinafter referred to as "planar articles". This need for economy derived from the long-accepted design requirement that such planar walls must be of equal or greater thickness than the thickest section of the side wall or rim structure surrounding the planar wall in order to ensure satisfactory filling of the mould during moulding, and an almost invariable result has been that the thicknesses so required have been far in excess of the functional strength needs of the said planar wall.

Several serious problems had to be considered in contriving a rib lattice structure which would achieve any measure of economy in such planar walls comparable to what had been gained in respect to the side walls of cup-like articles.

First, it was evident that the cross-lattice rib structure of my prior invention could not be effectively utilized to serve the planar wall of a lid-like article since the structure defined and illustrated in the aforesaid disclosure obviously required each of the two sets of criss-crossing ribs respectively to remain substantially parallel to each other 360 degrees around the vertical axis passing through the point of injection of the article. The reason for this parallelity requirement is that the main economy-yielding elements of the side wall rib lattice are the discrete thin rhomboidal webs resulting from application of the rib lattice structure and that these rhomboidal webs must be of substantially the same optimum area and shape over the entire area served by the rib lattice. This optimum must be determined individually for each article designed taking into account such variables such as the size of the article and the distance the molten plastic must flow to fill its mould, the melt viscosity of the particular plastic to be used, the injection pressures available on the moulding machine to be used and the functional strength required of the article. No geometrically practical configuration of criss-crossing ribs in which each set of ribs respectively remained parallel to each other 360 degrees around the centre of a planar wall could be found capable of producing the rhomboidal web structures which are essential to the side wall economies of my prior invention. And, abandoning the parallelity requirement, to project the angular ribs of the side wall rib lattice towards the central point of injection proved of no avail because the ribs converged at such a rate that the disparity in shape and area of the rhomboidal webs nearest the point of injection as compared with those nearest the perimeter was unacceptably large.

It should be explained herewith that the reason for the rhomboidal shape of the web enclosure is that I have found that the angle of departure of any ribs from the direct line of flow of plastic during mould filling must be confined to the range of 10 to 45 degrees so that the diversion resistance to the plastic flow is minimized and yet the criss-crossing ribs intersect to provide easy multi-directional filling of the thin webs.

Another serious problem, the problem of post-mould warpage, seemed to forbid the imposition of any kind of rib lattice on the flat planar wall of a lid-like article for it has been a long recognized experience in practice of the art that any unevenesses in the thickness of a planar wall, such as the presence of ribs on the wall, resulted in variations in the rates of cooling and solidification in various local areas and consequently, in variations of linear shrinkage, which, in the case of many common plastics, is inversely proportional to the rate of cooling. The danger to be avoided was the locking in of varying local shrinkage stresses with unacceptable warpage of the article occuring shortly after release from the mould.

Straight radial ribs running along the line of plastic flow from the point of injection to the perimeter of the planar wall were known in the prior art, as shown in U.S. Pat. No. 3,944,124 to Hexel and in Canadian Pat. No. 940,068 to Fennema, but it was a forbidding prospect that the complex pattern of a criss-cross rib lattice could be imposed on a planar wall without post-mould warpage.

Still another problem was that the geometric design specification of a rib lattice suited to integration with a substantially planar wall such as in a lid-like article had to be readily adaptable to provide whatever shape and size of rhomboidal web structure determined to be the above-mentioned optimum for each particular application.

And there was the all-important requirement that, while providing a net saving in material content, the rib lattice structure must provide that same ease of plastic flow across the planar wall as the conventional thick wall of the prior art.

The present invention provides a rib lattice structure which, when applied to a substantially planar wall of an article in which the point of injection is centrally located, overcomes the aforesaid problems. The structure provides a plurality of rhombodial webs all of the same area and shape over the area served by the rib lattice, and is of a defined geometric structure readily adaptable to serve all sizes and shapes of planar walls. Its effect is to provide such planar walls of planar articles with equal or greater economies as provided by the rib lattice of distinctly different design does for the side walls of cup-like articles.

A variety of theories can be offered to explain how the novel design of rib lattice of the present invention overcomes the formidable problems cited above and achieves substantial economies in planar articles.

First, the passageways provided in the closed mould to allow formation of the rib network, being of relatively large cross-section as compared to the moulding spaces for formation of the webs, serve as an interlocking network of conduits for the inrushing molten plastic during the moulding of the article and permit the filling of thinner basic walls than heretofore practical in planar walls since each discreet web is completely surrounded by ribs and this is "flash" filled from multiple directions from the ever-freshened supply of hot plastic flowing in the rib "conduits". It has been found that webs as thin as 0.025 centimeters can be filled successfully with the aid of this rib lattice. A substantial material economy in the plastic content of a planar wall ranging from 20% to 40% over that of a conventional smooth wall results from the fact that the very thin web areas comprise between 25% and 50% of the total planar wall and the total mass of the ribs constitute a very small fraction of the total mass of the wall in various applications.

The network of intersecting ribs, in addition to aiding the filling of very thin web areas, serves to conduct the molten plastic just as readily to the moulding terminus of the article as in the case of a conventional smooth planar wall, the ribs being of sufficient cross-section to retard the cooling of the plastic therein. Also these interlocked ribs effectively enhance the rigidity and strength of the said planar wall, off-setting any loss of strength from the material reduction.

Still another contribution of my present rib lattice structure is to the strength-to-weight ratio of a thin planar wall for there appears to be a notable reduction in the residual internal stress from unsatisfied shrinkage in the finished article. The explanation of this benefit would appear to be as follows: In the case of moulding of a conventionally designed thin-walled article in which the walls are smooth and of equal thickness at all points, the plastic solidifies in all areas at the same instant while the article is still in the rigid confines of the tightly closed mould and a complex pattern of internal stress arising from shrinkage of the plastic during its change to the solid state is locked into the wall, having no direction in which to relieve itself. However, a different situation prevails in a wall bearing a lattice of intersecting ribs when the plastic freezes in the mould. First the plastic in the thin webs freezes and much of the shrinkage stress which would normally remain in the webs relieves into the close-by ribs which are still molten by reason of their greater cross-section mass. When the rib runs freeze they in turn relieve stress into the adjacent rib intersections which are the last points to solidify, again because of their still greater cross-section mass.

Not only does reduction of internal stress improve the impact resistance of any thin walled plastic article, but this effect may explain why we escape the problem of post-mould warpage in applying the rib lattice structure to the planar wall of a planar article. Another reason may be that the total rib lattice of the invention is a balanced isometric configuration and that any local shrinkage stresses remaining after moulding cancel each other out.

A further benefit of the present invention has been found to be a tendency of the angular ribs to induce the plastic to flow in a multi-oriented pattern during moulding, resulting in a multi-oriented grain in the plastic of the planar wall, minimizing the susceptability of the wall to splitting when stressed.

In the production by injection moulding of such divers articles as large pails, serving trays, and the like vessels and containers with large planar wall areas, it is sometimes the practice to provide the mould with two or more points of injection. Thus, the present invention seeks to provide a rib lattice structure adaptable to interfacing with two or more duplications of the same structure in configurations which will achieve the same advantages as when only one point of injection is utilized, it being understood that the term "planar articles" used herein is intended to encompass the aforementioned articles.

SUMMARY OF THE INVENTION

With the foregoing and other aspects in view, the present invention generally concerns a plastic article, injection moulded, comprising a substantially planar main wall with a point of injection centrally located in the said planar wall, and a side wall or rim structure and a moulding terminus located at the extremity of the side wall or rim structure, and having superposed on at least one side of a portion or all of the said planar wall a cross-lattice network of rib integral with the said wall and consisting of a plurality of trunk ribs radiating outward from the point of injection at equal angles to each other of between 10 and 45 degrees, each said trunk rib directed along a theoretical line of shortest distance from the point of injection to the moulding terminus, said trunk ribs being supplemented with ribs branching out in opposing pairs at equal intervals along the trunk ribs, each rib from a trunk rib proceeding on a line parallel to the adjacent trunk rib on the same side and intersecting branch ribs from the said adjacent trunk rib whereby said trunk and branch rib interact to form a plurality of discreet rhomboidal web segments, each said web segment entirely bounded by ribs being of substantially uniform size and shape, the short axis of the rhomboidal segments being within the range of 18 to 35% of the long axis of the rhomboidal segments and the total cubic volume of the ribs being within the range of 15 to 35% of the cubic volume of the basic planar wall underlying the rib lattice.

BRIEF DESCRIPTION OF THE DRAWINGS

The invention will now be described further by way of example with reference to the accompanying drawings, in which:

FIG. 7 illustrates a decline in basic wall thickness towards the periphery of the wall;

The plastic container lid depicted in FIGS. 1, 2 and 3 is representative of a large number of articles in the fields of container closures, dishes, trays and containers themselves in which a planar wall containing centrally a point of injection is either the main wall of the article or is of sufficient area to constitute a significant portion of the total wall area of the article. In FIG. 1 the article depicted includes a point of injection 1, a small hub area 2 being a circular smooth area produced by the confluence of all the trunk ribs, the ribs 3 and a side wall structure which in this case is an inverted "U"-shaped rim 4.

Figure 1:
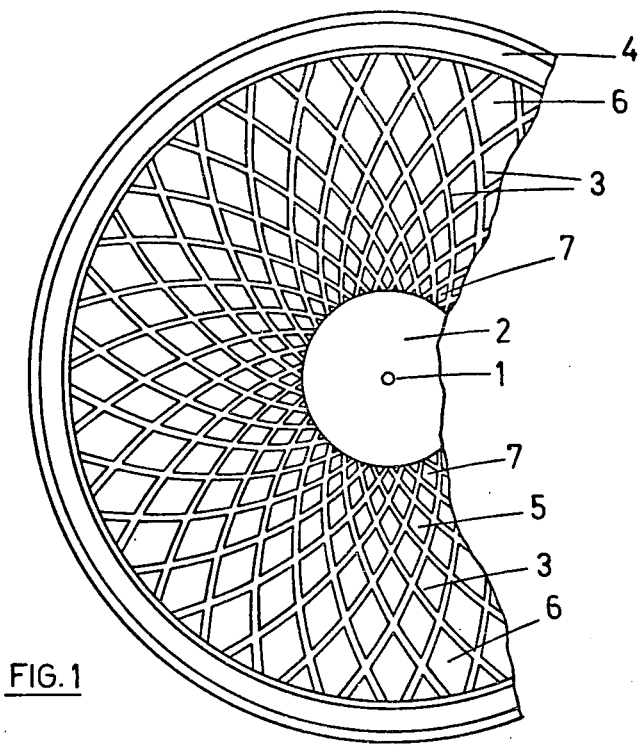
FIG. 1 is a plan view of a plastic container lid, the main bottom area of which bears a rib lattice conforming to the rib lattice structure defined in my prior invention.

The rib lattice in FIG. 1 represents an attempt to adapt the rib lattice as defined in my prior invention for application to a side wall to serve a planar wall. It will be observed from FIG. 1 that the uniformity of size and shape of the rhomboidal web enclosures, the importance of which is set forth in the foregoing specification, cannot be obtained on a planar wall without a substantial change in the defined geometry of the rib lattice. The webs 6 furthest from the hub 2 are obviously four or more times the area of the webs 7 close to the hub and a similar differential exists in the frequency of ribs serving each unit of wall area.

Figure 2:
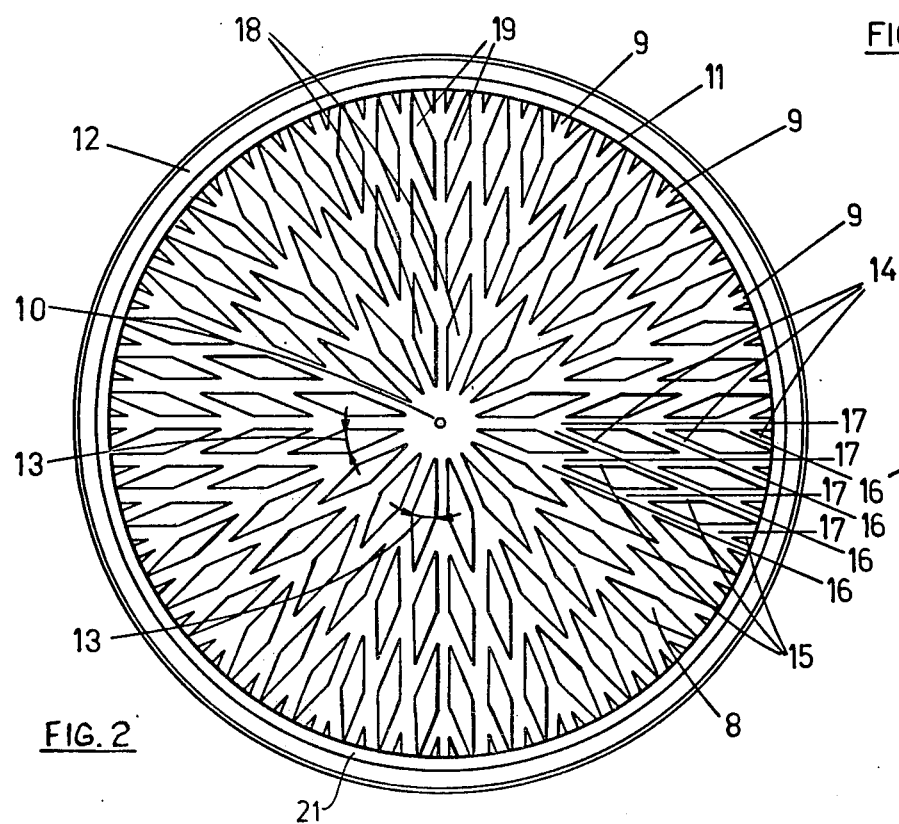
FIG. 2 is a plan view of a plastic container lid bearing the novel rib lattice configuration of the present invention.

FIG. 2 is a full scale underside plan view of a similar container lid as depicted in FIG. 1 but bearing on its bottom wall 8 the rib lattice of the present invention. The basic structure of the new rib lattice will be appreciated through a study of this example application. It will be seen that a plurality of "trunk" ribs, three of which are indicated by the numeral 9, run in the direct line of shortest distance from the point of injection 10 to the outer perimeter of the rib lattice 11 which in this example is the commencement of the side wall structure 12 of the article. All trunk ribs are at equal angles 13 to each adjacent trunk rib.

Although there may be a greater or lesser number of trunk ribs in other applications, in this example there are sixteen trunk ribs and the angle of divergence from each other is 22½ degress. It has been found that in various applications the angle of divergence should not be less than 10 degrees or greater than 45 degrees totalling 360 degrees around the point of injection.

It will be further observed that at equally spaced intervals proceeding outward along each trunk rib 9 from the point of injection 10 two branch ribs depart from each trunk rib at each interval, one in a clockwise direction designated by numeral 14 and one in an anti-clockwise direction designated by numeral 15. It will be further observed that each of the ribs 14 branching clockwise proceeds outward parallel to the adjacent trunk rib on the same side, i.e. on the same common side, and that each of the anti-clockwise ribs 15 proceeds in parallel to the nearest trunk rib on the anti-clockwise side, i.e. again on the common side. To illustrate this in FIG. 2, the centre line of branches 14 and their related clockwise trunk ribs have all been projected to the outside of FIG. 2 along with imaginary lines 16. Similar imaginary lines 17 have been projected for the anti-clockwise ribs 15 and their common adjacent anti-clockwise trunk rib. It will be seen that the four branch ribs 16 are parallel to each other and the four branch ribs 17 are parallel to each other.

When the foregoing structure is followed the branch ribs intersect with each other at equal angles and at equal intervals with the result that each discrete web is of the same shape and area regardless whether it is close to the central point of the rib lattice 18 or to the perimeter. It will also be apparent that frequency of ribs per square centimeter is maintained over the entire area served by the rib lattice.

Figure 3:
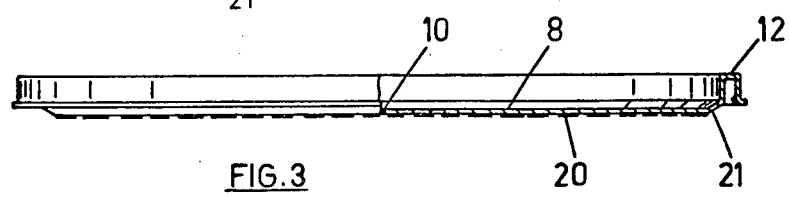
FIG. 3 is an elevation, partly in section, of the lid depicted in FIG. 2, the broken line representing the peak level of the ribs comprising the rib lattice.

FIG. 3, an elevational view of the container lid of FIG. 2, half cut away to show a section, illustrates the relationship of the rib lattice to the total article. In this example the rib peak level represented by the broken line 20 is 0.038 centimeters at peak thickness and the side wall 12, in this example a rim structure, are both shown in cross-section. As shown in FIG. 2, the rib lattice ends at the rise 21 toward the rim structure 12.

Although the planar wall as illustrated in FIG. 3 is completely flat in this example, it has been found that the rib lattice of this invention works equally well when a minor convexity or concavity of the planar wall exists provided the linear right angle dimension of the convexity or concavity is no greater than 15% of the diameter or longest axis of the planar wall.

In this example embodiment shown in FIGS. 2 and 3, the rib lattice is applied to the underside of the bottom wall 8 so as to leave the top of the wall smooth for easier printing. However, the rib lattice of this invention may be applied to either side of the wall with equal effectiveness. Also, while the rib lattice illustrated in FIG. 2 covers all the bottom wall area except a small hub area 22, in other applications the coverage of the rib lattice may include either a smaller hub area of spherical contour or a larger smooth hub area. In other applications the rib lattice may stop short of the perimeter of the wall so as to provide a smooth peripheral band for such purpose, for instance, as imprinting the manufacturer's identification or citing patent numbers. Another optional feature of the rib lattice illustrated in FIG. 2 is that the equal interval of branchings from the trunk ribs has been selected so as to result in the final outer branchings occurring a half interval short of the lattice perimeter. This results in close spacing of the rib ends at the perimeter and provides for the easiest possible flow of plastic into the side wall structure during moulding.

Figure 4:
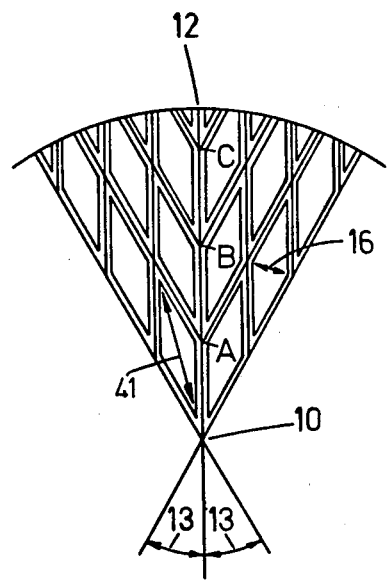
FIGS. 4 and 5 represent segmental fragments of two alternative rib lattices of the present invention illustrating the variations in web shapes and dimensions and in rib density per unit of wall area possible within the formula of the new rib lattice definition.
Figure 5:
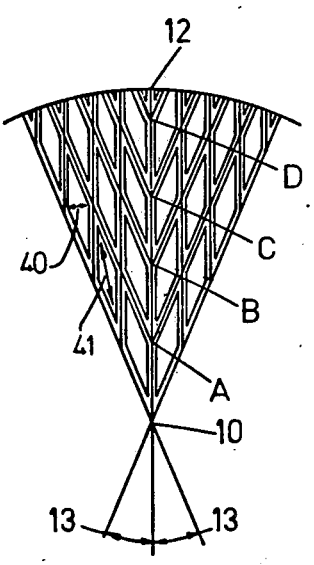

FIGS. 4 and 5, being fragmental segments of two alternative rib lattice structures, illustrate how shapes and areas of the rhomboidal web portions and the rib frequencies can be readily altered to suit the requirements of each individual application by manipulation of two variables, the measure of the equal intervals of branching and the angle of diversion between adjacent trunk ribs, without departure from the basic rib lattice structure specified in this invention. In both these segments the length of the trunk ribs from the point of injection 10 to the perimeter of the rib lattice 12 is the same but in FIG. 4 the angle 13 between the trunk ribs 9 is 30 degrees while the angle 13 between the trunk ribs of FIG. 5 is 22½ degrees. In FIG. 4 the equally spaced intervals of branching marked A, B and C have been selected to result in three branchings whereas in FIG. 5 the interval selected results in four branchings A, B, C and D. It will be apparent from a comparative study of these two Figures that the length of the short axis 50 of the web rhomboids in relation to the long axis 41 may readily be controlled to suit each application by selection of an appropriate interval for branchings. It will be observed that the acute angles of the rhomboid rib enclosures are automatically identical with the angle of diversion between adjacent trunk ribs.

Designs resulting in the short axis of the web rhomboids falling within the range of 18 to 35% of the long axis, the long axis always being in the general direction of the line of flow of the plastic during moulding, are required for satisfactory performance of the rib lattice. Also it has been found that the total cubic volume of the ribs should fall within the range of 15 to 35% of the cubic volume of the basic planar wall underlying the ribs to produce the benefits described in the foregoing text.

FIGS. 2, 4 and 5 show a range of areas of web segments relative to total areas of cross-lattice network of about 40 to about 65%; FIG. 2 showing 40%, FIG. 4 showing 62%, and FIG. 5 showing 48.5%.

In the moulding of the planar walls of some articles when the plastic being used is of a free flowing type in its molten state and when the area to be covered by the rib lattice is not excessively large, it is satisfactory for the cross-section area of the ribs and the thickness of the basic wall underlying the ribs to remain constant all the way from the point of injection or hub to the outer extremity of the rib lattice. However, such is not the case when a high viscosity plastic must be used or a large planar wall area must be filled so it is sometimes required to provide for easing of the initial flow of plastic from the point of injection into the expanding outer area of the planar wall.

Figure 6:
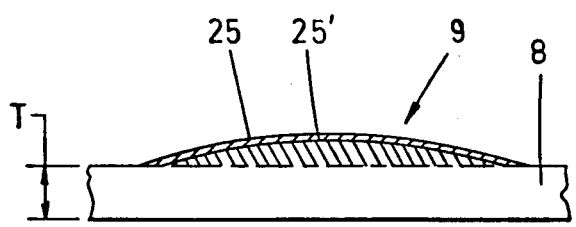
FIG. 6 is an enlarged cross-sectional view of one of the trunk ribs of the invention and the integral portion of the underlying basic wall representing a reduction in the cross-sectional area of a rib towards the rib periphery.
Figure 7:
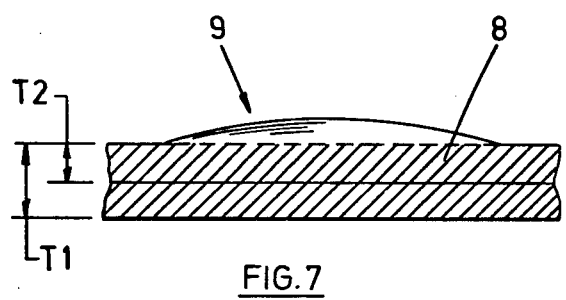
FIG. 7 is an enlarged cross-sectional view of one of the trunk ribs of the invention and the integral portion of the underlying basic wall. Alternative to the decline in rib cross-sectional area depicted in FIG. 6.

FIGS. 6 and 7 illustrate alternative methods of accomplishing this. One of these is to provide trunk ribs 9 with a relatively high cross-section area and decline at a steady rate to a lower cross-section area at the perimeter of the rib lattice. The other is to provide for a basic wall 8 having a relatively higher thickness at the point of injection and tapering down in thickness as it proceeds outward towards its perimeter.

FIG. 6 is a large scale cross-section view of a trunk rib 9 and the underlying portion of the basic wall 8 with which it is integrated. The arc marked 25 represents the cross-section contour of the rib adjacent to the point of injection or hub and the arc marked 25' represents the decreased rib cross-section at the outer limits of the rib lattice. A decrease in cross-section area of approximately 40% is represented. When such a decrease is desirable it has been found it should be specified to fall within the range of 20 to 50%.

FIG. 7 is a large scale cross-section view of a trunk rib 9 and the underlying portion of the basic wall 8 with which it is integrated. In this illustration the basic wall thickness decreases about 50% from T1 at the point of injection to T2 at the rib lattice perimeter, the rib cross-section remaining constant. When such design strategy is desirable, a decrease within the range of 20 to 50% is allowable depending on the circumstances of the application.

The ribs of the planar wall of the instant invention can be of any desired cross-section profile as long as the profile does not constitute an undercut which would interfere with stripping from the mould of the finished article. Most frequently in planar walls across which the plastic must flow to fill the mould during moulding relatively wide ribs of circular-arc cross-section contour are preferred since this profile provides a minimum resistance to the flow of plastic while providing a maximum area of contact with the cold walls of the mould for faster freezing of the plastic therein in its order of sequence aforementioned.

Figure 8:
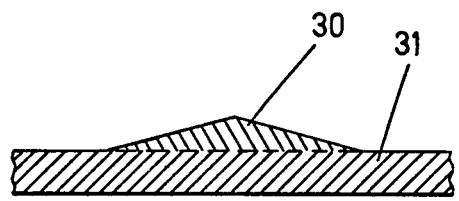
FIG. 8 represents a large scale cross-sectional view of one of either a trunk or branch rib of the present invention and the integral portion of the underlying basic wall, illustrating one of the many variations of rib shapes permissible in the rib lattice of the invention.

FIG. 8 shows an alternative rib cross-section profile in which the rib 30 integral with the underlying basic wall 31 is triangular in profile. This profile is satisfactory where ease of plastic flow is not a critical matter and maximum economy of plastic forming the ribs is desired because the triangular profile is only about 75% of the area of a rib of the same width and height of circular-arc profile.

Figure 9:
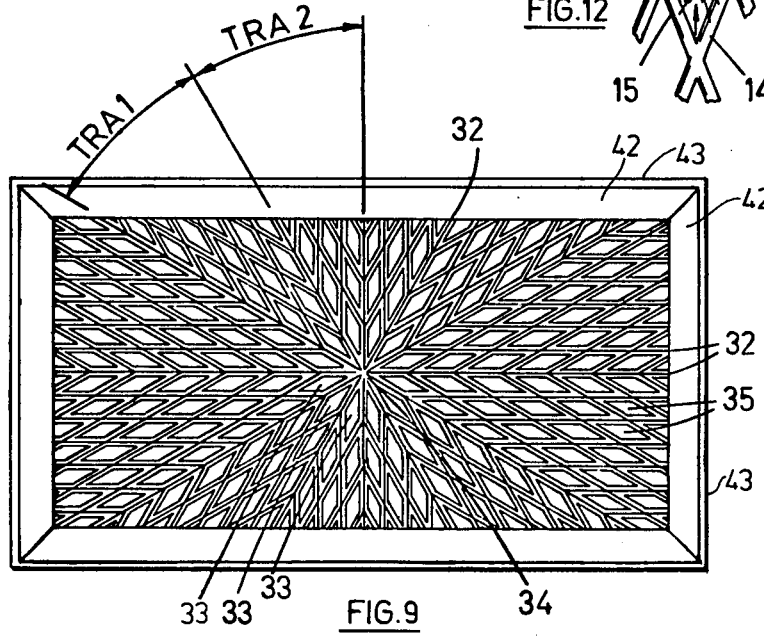
FIG. 9 represents the underside view of a rectangular container in which the article of the present invention has been moulded integrally with suitable side walls so as to comprise a planar bottom wall of the container. It also illustrates one of the many shapes the planar wall of the present invention may take, without departure from rib lattice structural formula specified herein.

FIG. 9 represents a down-scaled bottom view of a rectangular injection moulded plastic container in which a substantially planar wall bearing the rib lattice defined in the present invention, forming the bottom wall of the container, is moulded integrally with four side walls 42 out-sloping as they proceed upward to terminate in a flanged rim structure 43 at the top. This application of the planar wall rib lattice has been found to permit reduction of 20 to 40% of total plastic content from that of a conventionally designed smooth planar wall. But a more important contribution to the economy of the article is that it permits increases in the cycling speed of moulding by as much as 25%. This is because in a plastic container of conventional design in which the point of injection is located centrally in the bottom wall, a bottom wall thickness substantially in excess of the functional strength needs of the wall is required to assure easy filling of the side wall and rim structures of the container during moulding. The plastic forming the relatively thick bottom wall is the last plastic into the mould so it is the last to solidify and thus determines the allowable cycling speed of moulding. The substantially reduced plastic mass of the planar bottom wall permitted by the present invention allows faster freezing and effectively diminishes the restriction on moulding speed by permitting earlier stripping of the container from the mould.

FIG. 9 also illustrates the applicability of the rib lattice of the present invention to any shape of planar wall, the shape chosen for this example being a rectangle. It should be noted that, unlike the equal length trunk ribs 9 provided in the circular planar wall of FIG. 2, the trunk ribs 32 proceed over the entire distance required in each instance to reach the perimeter of the rib-lattice wall. The significant feature to be observed in FIG. 9 is that without departure from the basic definition of the rib structure of the present invention, the web shapes and areas and the rib densities remain unchanged over almost the entire rectangular area served by the rib lattice, thus providing the planar wall with the benefits of the invention. Specifically, in FIG. 9 it will be noted that the trunk rib angle TRA1 equals trunk rib angle TRA2 and that all other trunk rib angles are the same. Further it will be evident that all ribs branching from the clockwise side of each trunk rib are all parallel to the nearest adjacent trunk rib on that side and that the converse is true for all ribs branching on the anti-clockwise sides of the trunk ribs. The result is that all webs 33 adjacent to the point of injection 34 are equal in shape and area to the last complete discreet webs 35 approaching the outer perimeter.

Since the planar wall rib lattice can be applied to many shapes of walls other than those illustrated in FIGS. 2 and 9, the container-type articles with planar bottom walls served by the rib lattice can also be of many shapes and sizes.

Figure 10:
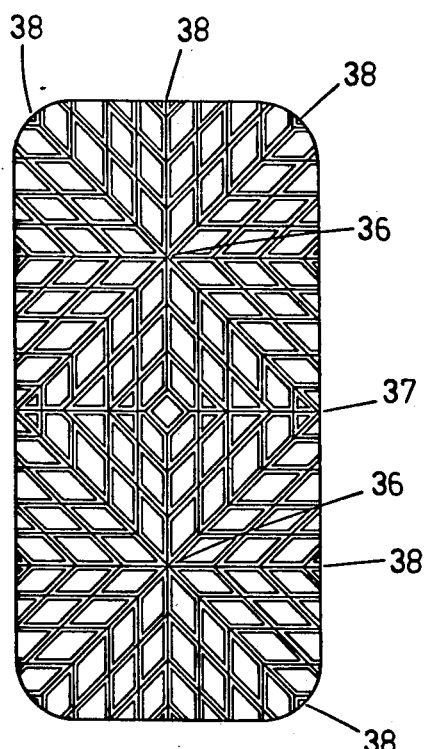
FIG. 10 represents in small scale the bottom wall of a tray-like article provided with two points of injection and with two identical rib lattices radiating from each point of injection and the rib lattices adjusted in configuration so as to interface symmetrically at points equidistant from the two points of injection. The short side walls of the tray are not shown.

FIG. 10 illustrates the applicability of the rib lattice of the invention to a bottom wall containing two or more points of injection. FIG. 10 is a scaled-down view of the planar wall of an article which would be a large tray or container. Side walls have not been included in the illustration. It will be seen that two identical rib lattice structures emanate from two points of injection 36 and that in each rib lattice the basic rib lattice structure as defined in this invention has been followed, the only exception being that a special rib 37 has been provided along the line of interface between the two lattices. It should be noted that the equal angles between the trunk ribs 38 and the equal intervals of branching have been carefully selected so that, with the aid of the special rib 37, the web areas adjacent to the line of interface are, in the main close in area to the web areas elsewhere in the rib lattices and variations in density of rib coverages are minimized.

Figures 12, 13:
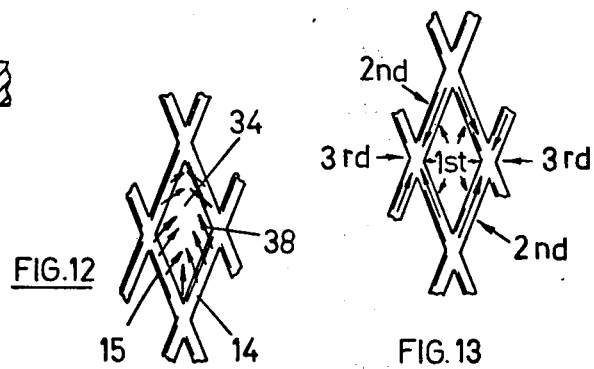
FIG. 12 represents a single web portion delineated by the rib lattice of the invention with its bounding ribs and with arrows inscribed to show the various directions in which the plastic flows from the rib ducts into the web areas during moulding.
FIG. 13 represents a single web portion with its bounding ribs with arrows showing the directions in which shrinkage stress may be dissipated as the webs, the adjacent ribs and then the rib intersections freeze in sequence during moulding.
Figure 11:
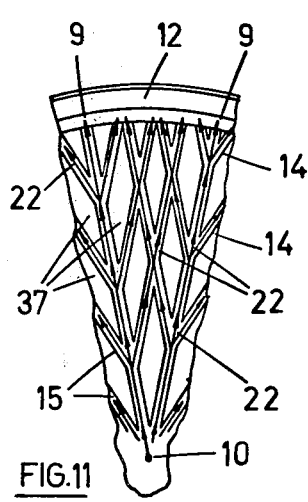
FIG. 11 represents a fragment from the bottom wall of an article bearing the rib lattice of the invention with arrows indicating the lines of principal flow of the molten plastic from the point of injection to the periphery of the rib lattice during moulding of the article.

FIGS. 11, 12 and 13 show the manner in which the rib lattice of the present invention contributes to the planar wall of an injection moulded plastic article the principal benefits of material content economy, strength enhancement and production economy. FIG. 11 is a fragmentary segment of the container lid depicted in FIG. 2 showing the point of injection 10, a segment of rib lattice containing two trunk ribs 9, a complement of intersecting branch ribs 14, 15 and a segment of the side wall rim structure 12 on the perimeter of the rib lattice. Arrows 22 emplaced along the centre line of each trunk and branch rib show the many relatively low resistance pathways by which the molten plastic can flow out from the point of injection to fill the relatively massive rim structure during moulding despite the fact a major portion of the total wall is composed of very thin web areas 37. It will be evident from a viewing of FIG. 11 that the interlocking rib structure provides an advantageous flexural strength to the wall by inducing the plastic to flow into the mould in such a pattern as to result in a multi-oriented grain in the plastic of the finished article.

FIG. 12 is a representation of a single rib-enclosed web and is for the purpose of showing how exceptionally thin webs are easily filled during moulding. Arrows 38 indicate the multi-directional flow of molten plastic from the surrounding ribs 14, 15 into each web 34 which occurs during moulding. Because of the relatively large cross-section masses of the ribs plus the substrate of basic wall, the plastic tends to retain its heat and stay in a molten free-flowing condition all the way through the rib lattice and the thin webs are filled from this ever-freshened supply of hot plastic in the ribs.

This ease of "flash" filling of very thin webs from various directions out of the enclosing ribs is enhanced by the lattice structure which must be such as to result in rib-delineated rhomboids elongated in the direction of plastic flow, the angle of deviation of the ribs from a straight line of flow being selected to offer a minimum of resistance to the main flow of plastic but just enough to induce the molten plastic to enter freely into the thin mould spaces provided for formation of the webs.

FIG. 13 is again a representation of a single web with its enclosing ribs and illustrates the mechanics of the residual stress reduction believed to be effected by the rib lattice. Unlike the situation which prevails in the moulding of a thin-walled article with walls of equal thickness in all areas freezing at the same instant in the mould and thereby locking patterns of shrinkage stress into the article, the wall bearing the lattice of intersecting ribs freezes at sequential intervals. In FIG. 13 the legends 1st, 2nd and 3rd indicate the order of freezing and the arrows indicate the directions in which shrinkage stress is progressively relieved as the wall solidifies in the mould. First the thin webs freeze and shrinkage stress relieves into the nearby ribs which are still molten because of their superior mass. Next the rib runs freeze and relieve stress into the nearest rib intersections because of the still greater plastic masses at these points.

The plastic container lid in FIG. 2 is only one of many plastic articles having a planar wall as a major component which could have been used as an example of the instant invention. However, a citing of some of the comparative statistics against those of the same lid in conventional design should be useful in indicating the economic benefits attainable.

Composed of polyethylene, the conventional lid from which the FIG. 2 lid was modelled has a planar wall 0.076 centimeters in thickness and a total material content of 12.35 grams. With the benefit of the rib lattice the basic planar wall substrate to the ribs is reduced to 0.015 centimeters in thickness and the total weight of the article including the ribs and rim structure is 7.1 grams, a total material saving of 42%. As well, while the lid of convention design moulds at only about seven shots per minute, mould cycling production as high as twelve shots per minute has been obtained with the lid of the present invention.

What I claim as new and desire to protect by Letters Patent of the United States of America is:

1. An injection moulded planar article which includes as a significant component of the total article a planar wall substantially flat over most of its area, said planar wall containing at its centre the point of plastic injection for the entire article, said planar wall being integrated around its perimeter with a side wall or walls ending in a rim structure which constitutes the terminus of moulding, said planar wall having superposed on at least one side a cross-lattice network or ribs integral with the said planar wall and consisting of a plurality of trunk ribs radiating outward 360 degrees around the point of injection at equal angles to each other ranging between 10 and 45 degrees, said trunk ribs being directed along a theoretical line of shortest distance through the walls of the article between the point of injection and the moulding terminus, said trunk ribs each being supplemented with two or more pairs of ribs branching out in opposing pairs at equal intervals along the trunk rib, each branch rib proceeding along a line parallel to the adjacent trunk rib on the same side and intersecting branched ribs from the said adjacent trunk rib whereby said trunk ribs and branch ribs interact to form a plurality of discreet web segments of rhomboid form each web segment entirely bounded by ribs being of uniform size and shape, the short axis of the rhomboidal segments being within the range of 18 to 35% of the long axis of the rhomboidal segments and the total cubic volume of the ribs being within the range of 15 to 35% of the cubic volume of the basic planar wall underlying the rib lattice.

2. An injection moulded plastic planar article as claimed in claim 1, additionally comprising two or more points of injection in its planar wall, each point of injection being the centre of a rib lattice of the same structure as defined in claim 1, but with an additional rib provided along the line of interface between any two rib lattices, all points on the said additional ribs being equidistant from the two adjacent points of injection.

3. An injection moulded plastic planar article as claimed in claim 1, in which the basic planar wall bearing the rib lattice is of a maximum cross-sectional thickness in its central area and decreases at a steady rate in the range of 20 to 50% of its maximum thickness towards its periphery.

4. An injection moulded plastic planar article as claimed in claim 1 in which the said trunk ribs decrease in cross-section in the range of 20 to 50% from a maximum at the centre of the rib lattice to a minimum at the periphery.

5. An injection moulded plastic planar article as claimed in claim 3 in which said discrete web segments entirely bounded by ribs of substantially uniform size and shape constitute from about 40 to about 65% of the total area of cross-lattice network.

* * * * *